United States Patent
Reyes Baron et al.

(10) Patent No.: US 11,014,570 B2
(45) Date of Patent: May 25, 2021

(54) FRONT CAR REAR TIRE ANOMALIES DETECTION SYSTEM AND RELATED METHODS

(71) Applicant: Continental Automotive Systems, Inc., Auburn Hills, MI (US)

(72) Inventors: Omar Sadrach Reyes Baron, Zapopan (MX); Jose Ramon Casillas Bracamontes, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 99 days.

(21) Appl. No.: 16/215,166

(22) Filed: Dec. 10, 2018

(65) Prior Publication Data
US 2020/0180649 A1  Jun. 11, 2020

(51) Int. Cl.
*B60W 50/00*  (2006.01)
*B60T 7/16*  (2006.01)

(52) U.S. Cl.
CPC ............ *B60W 50/0098* (2013.01); *B60T 7/16* (2013.01); *B60W 2420/42* (2013.01); *B60W 2530/20* (2013.01)

(58) Field of Classification Search
CPC ......... B60W 50/0098; B60W 2530/20; B60W 2420/42; B60W 2720/10; B60W 2050/143; B60W 2554/404; B60W 50/14; B60T 7/16; B60T 2270/402; B60T 7/22; B60T 2201/022; B60T 8/17; B60T 2240/04; G01S 13/00; G01S 15/00; G01S 17/00

See application file for complete search history.

(56) References Cited

U.S. PATENT DOCUMENTS

| 7,082,819 B2 | 8/2006 | Thiesen et al. |
| 2012/0044066 A1* | 2/2012 | Mauderer ............... G08G 1/161 340/479 |
| 2017/0200326 A1 | 7/2017 | Liu et al. |
| 2017/0365105 A1* | 12/2017 | Rao ........................ G07C 5/006 |

FOREIGN PATENT DOCUMENTS

EP         3202600 A1     8/2017

* cited by examiner

*Primary Examiner* — Michael V Kerrigan

(57) ABSTRACT

A method includes observing one or more rear tires for a front car, the one or more rear tires include a left rear tire and a right rear tire, determining whether the one or more of the rear tires have an anomaly, observing a chassis of the front car to determine if there is an inclination, and sending an alert if the one or more rear tires have the anomaly.

18 Claims, 4 Drawing Sheets

FRONT CAR REAR TIRE ANOMALIES DETECTION SYSTEM AND RELATED METHODS

TECHNICAL BACKGROUND

Advanced Driver Assistance Systems (ADAS) will allow for vehicles to drive in closer proximity to each other than a typical human-only operated vehicle, allowing for a more efficient use of highways and roads. However, the risk of accidents may increase as car density increases on the roadways.

One cause of accidents is a result of if tire pressure is too high or too low. If tire pressure of a vehicle is too high while the vehicle is moving, a contact area between the tire and the ground is reduced, grip of the tire is affected, and/or imminent tire failure is expected. If tire pressure of a vehicle is too low, steering of the vehicle is affected, and could be an indication of imminent tire failure is expected.

What is needed is a better way to monitor adjacent vehicles for imminent tire failure to improve vehicle safety.

BRIEF SUMMARY

A method includes observing one or more rear tires for a front car, the one or more rear tires include a left rear tire and a right rear tire, determining whether the one or more of the rear tires have an anomaly, observing a chassis of the front car, and sending an alert if the one or more rear tires have the anomaly, such as low tire pressure or a rupture.

In one or more embodiments, the method further includes determining whether the chassis has an inclination.

In one or more embodiments, the method further includes sending an alert if the one or more rear tires have the anomaly and the chassis has the inclination.

In one or more embodiments, sending the alert includes alerting a driver via a dashboard.

In one or more embodiments, determining whether the one or more of the rear tires have the anomaly includes comparing difference in shape from the left rear tire and the right rear tire.

In one or more embodiments, determining whether the one or more of the rear tires have the anomaly includes determining whether one or more of the rear tires have low pressure.

In one or more embodiments, determining whether the one or more of the rear tires have the anomaly includes determining whether one or more of the rear tires have ruptured.

In one or more embodiments, sending the alert includes alerting a braking system if the anomaly is present.

In one or more embodiments, the method further includes controlling a braking system if the anomaly is present.

In one or more embodiments, the method further includes preparing a braking system for sudden braking if the anomaly is present.

In one or more embodiments, the method further includes controlling a velocity of the first vehicle if the anomaly is present.

In one or more embodiments, the method further includes signaling hazard lights of the first vehicle if the anomaly is present.

In one or more embodiments, the method further includes observing a shape of the left rear tire and the right rear tire and determining if the car is overloaded with weight.

A front car rear tire anomalies detection system includes a vision system configured to be mounted on a first vehicle, where the vision system is configured to observe one or more rear tires of a front car, the vision system configured to observe a chassis of the front car. The system further includes a processor communicatively coupled with the vision system, the processor configured to determine whether the one or more of the rear tires have an anomaly, the processor configured to determine whether the chassis has an inclination. A communications module communicatively coupled with the processor, the communications module configured to send an alert if the one or more rear tires have the anomaly.

In one or more embodiments, the processor is configured to determine whether the chassis has an inclination.

In one or more embodiments, the communications module is configured to send the alert if the one or more rear tires have the anomaly and the chassis has the inclination.

In one or more embodiments, the processor is configured to compare a difference in shape from the left rear tire and the right rear tire.

In one or more embodiments, the processor is configured to prepare a braking system for sudden braking if the anomaly is present.

In one or more embodiments, the processor is configured to control a velocity of the first vehicle if the anomaly is present.

In one or more embodiments, the processor is configured to signal hazard lights of the first vehicle if the anomaly is present.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

Figure 1:
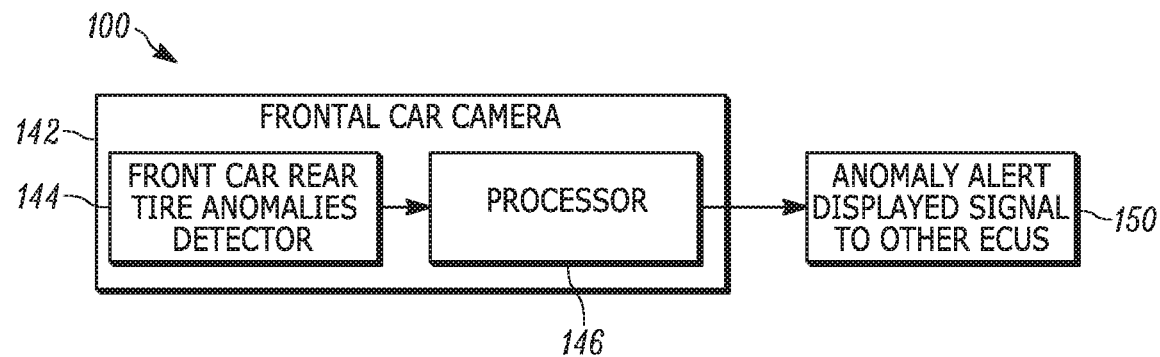
FIG. 1 illustrates a front car rear tire anomalies detection system, as constructed in accordance with one or more embodiments.
Figure 2:
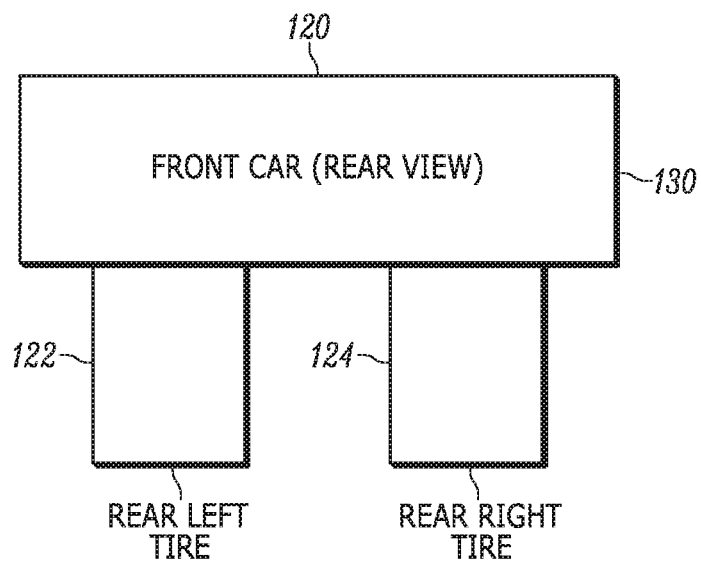
FIG. 2 illustrates a rear view of a front car, as constructed in accordance with one or more embodiments.

A front car rear tire anomalies detection system, is disclosed herein. The front car rear tire anomalies detection system allows for a first vehicle to monitor tires and tire shape and/or condition of another car, such as a front car that is driving near or in front of the first vehicle. As shown in FIGS. 1-2, the front car rear tire anomalies detection system 100 includes a vision system 140 configured to be mounted on a first vehicle 110, where the vision system 140 of the first vehicle is configured to observe one or more rear tires 126, such as a rear left tire 122 and/or a rear right tire 124 of a front car 120. The front car 120 relates to a car which is driving in front of or near the first vehicle 110. The vision system 140 is also configured to observe a chassis 130 and a chassis angle of the front car 120.

The front car rear tire anomalies detection system 100 further includes a processor 146 communicatively coupled with the vision system 140, the processor 146 is configured to monitor the shape of the tire and determine whether the one or more of the rear tires 126 have an anomaly. The tire anomaly is a condition of the tire that indicates the tire is about to fail or has failed, for example is no longer capable of safely operating. Examples of a tire anomaly include, but are not limited to, low pressure tire, high pressure tire, bulging of the tire, pinching of the tire, rupture of the tire, or foreign objects on or penetrating into the tire. In one or more embodiments, the processor 146 is configured to monitor the tires and determine if the front car 120 has been overloaded with weight, putting stress on the tires. The processor 146 compares tire shapes against images from a database to determine if the tires have an anomaly or are in danger of immediate damage. The processor 146 is further configured to determine whether the chassis 130 has an inclination 132 (FIG. 3), for example if the chassis 130 is leaning to one side. In one or more embodiments, the processor 146 is configured to control the velocity of the vehicle, for example by slowing the vehicle if tire failure of the front car is imminent or tire failure has occurred.

Figure 3:
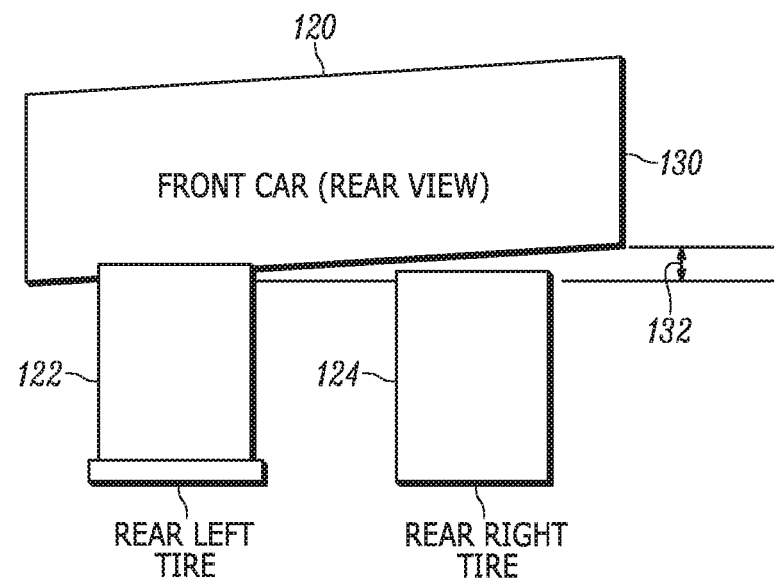
FIG. 3 illustrates a rear view of a front car, as constructed in accordance with one or more embodiments.
Figure 4:
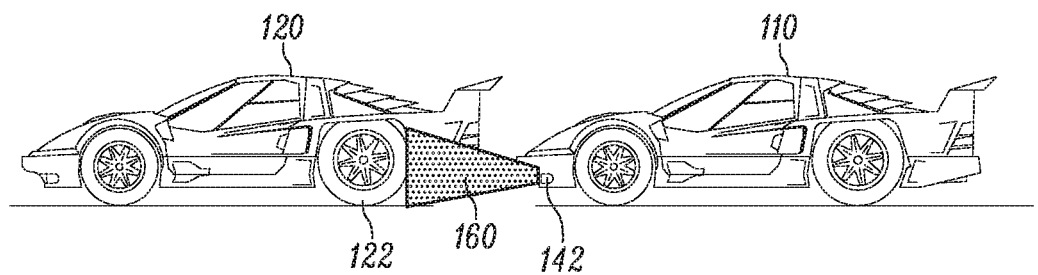
FIG. 4 illustrates a side view illustrating a method of use of the front car rear tire anomalies detection system, as constructed in accordance with one or more embodiments.
Figure 5:
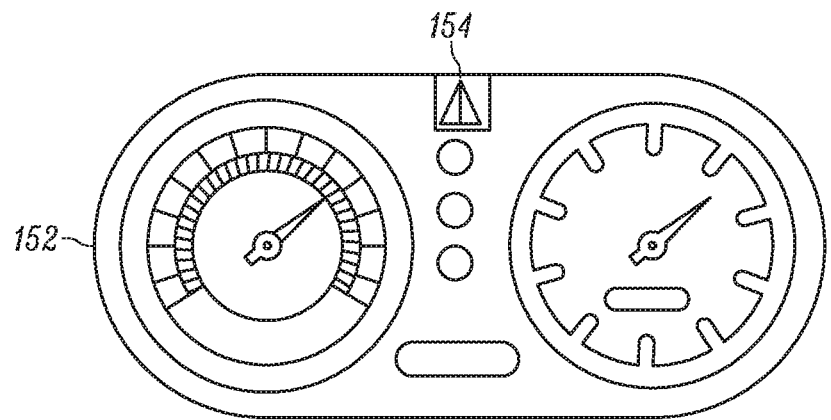
FIG. 5 illustrates a display for use with the front car rear tire anomalies detection system, as constructed in accordance with one or more embodiments.

A communications module 150 is communicatively coupled with the processor 146, where the communications module 150 is configured to send an alert 154 (FIG. 5) if the one or more rear tires 126 have the anomaly. The alert 154 can be sent to the driver, for example, by sending an alert to the dash 152 as shown in FIG. 5. In one or more embodiments, the communications module 150 is configured to send the alert 154 if the one or more rear tires 126 have the anomaly, and if it was determined that the chassis 130 has an inclination 132 (FIG. 3). The inclination 132 of the chassis 130 can be used to confirm that there will be a potential safety issue with the rear tires 126 once the anomaly has been detected.

In one or more embodiments, the processor 146 is configured to compare a difference in shape from the left rear tire 122 and the right rear tire 124. If one tire has a different shape than the other tire, it could be determined that an anomaly is present. In one or more embodiments, the processor 146 can further determine whether the chassis has an inclination 132 to confirm the anomaly and potential tire failure.

In one or more embodiments, the communications module 150 sends an alert to the braking system so the braking system can prepare for sudden braking if an anomaly has been detected, for example if there is low pressure in a tire. In another example, if the processor 146 detects that a tire has ruptured, the alert is sent to the braking system, and the braking system can prepare for sudden braking. Preparing for sudden braking can include breaking in short-time intervals or can include activating the brakes continuously but with low intensity, so the vehicle slows down but in a smooth way. In both cases, the vehicle does not necessarily stop completely in order to avoid an accident with another car that is traveling behind the first vehicle.

In one or more embodiments, the processor 146 is configured to control a velocity of the first vehicle if the anomaly is present. For example, the velocity of the first vehicle 110 can be decreased to increase a distance between the first vehicle 110 and the front car 120 if an anomaly has been detected. In another example, the velocity of the first vehicle 110 can be increased to allow the first vehicle 110 to pass the front car 120.

In one or more embodiments, the processor 146 is configured to signal hazard lights of the first vehicle 110 if the anomaly is present. For example, if an anomaly is detected by the vision system, and the processor determines that one or more of the rear tires have an anomaly, the processor activates the hazard lights of the first vehicle 110 to notify other surrounding vehicles that an event is imminent and to take greater caution.

Figure 6:
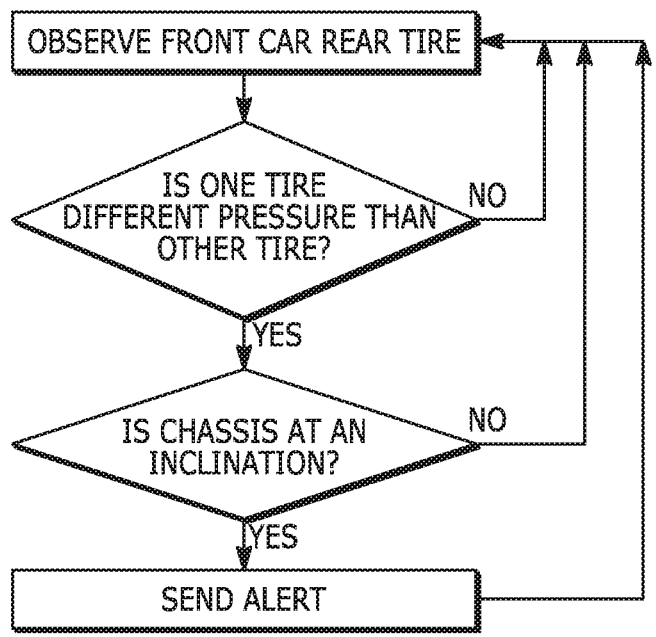
FIG. 6 illustrates a flow chart illustrating a method of use of the front car rear tire anomalies detection system, as constructed in accordance with one or more embodiments.
Figure 7:
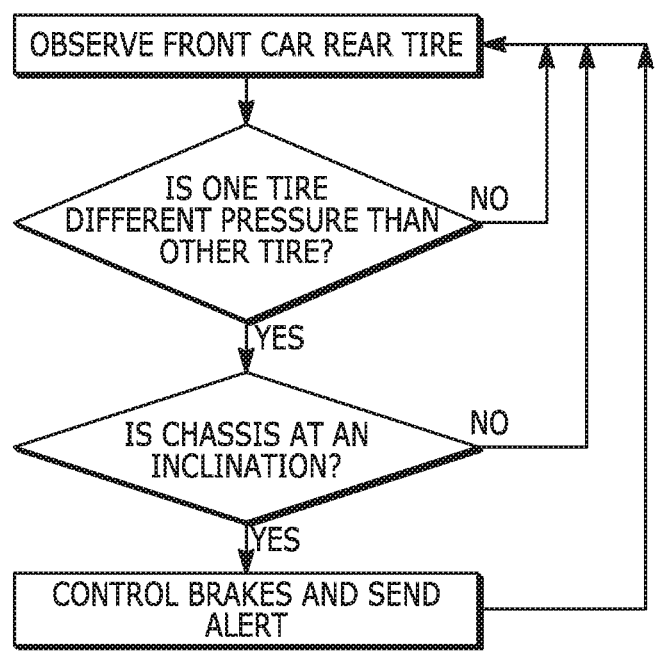
FIG. 7 illustrates a flow chart illustrating a method of use of the front car rear tire anomalies detection system, as constructed in accordance with one or more embodiments.

A method for detecting front car rear tire anomalies with a front car rear tire anomalies detection system is shown in FIGS. 6 and 7. The method for detecting front car rear tire anomalies allows for a first vehicle to monitor tires and tire shape and/or condition of another car, such as a front car that is driving near or in front of the first vehicle. In one or more embodiments, the method includes observing one or more rear tires for a front car, the one or more rear tires include a left rear tire and a right rear tire, determining whether the one or more of the rear tires have an anomaly, for example by observing the tire shape.

In one or more embodiments, determining whether the one or more of the rear tires have the anomaly includes comparing difference in shape from the left rear tire and the right rear tire. If at one point in time the tires have the same or similar shape, and then at a later point in time one of the tires has a different shape than the other tire, it could be determined that an anomaly is present. In another embodiment, if one or more of the tires has changed shape over a period of time, or if one or more of the tires suddenly changes shape, it could also be determined that an anomaly is present.

The method optionally includes observing a chassis of the front car and sending an alert if the one or more rear tires have the anomaly. In one or more embodiments, the method further includes determining whether the chassis of the front car has an inclination in combination with an indication of a tire anomaly, for example, a change of the tire shape. The inclination of the chassis of the front car can be used to confirm that the shape of the tire indicates that the anomaly is indicative of potential tire failure. In one or more embodiments, determining whether the one or more of the rear tires have the anomaly includes determining whether one or more of the rear tires have low pressure. In one or more embodiments, determining whether the one or more of the rear tires have the anomaly includes comparing difference in shape from the left rear tire and the right rear tire. In one or more embodiments, determining whether the one or more of the rear tires have the anomaly includes determining whether one or more of the rear tires have ruptured.

In one or more embodiments, the method further includes sending an alert if the one or more rear tires have the anomaly and the chassis has the inclination, for example in FIG. 3. Sending the alert can be done in a variety of different ways, and for a variety of different reasons. In one or more embodiments, sending the alert includes alerting a driver via a dashboard. The driver will then know to use additional caution regarding surrounding vehicles.

In one or more embodiments, sending the alert includes alerting a braking system if the anomaly is present. The brakes can optionally be prepared for sudden braking, for example, if the system determines that tire failure has occurred or is about to occur, i.e. if an anomaly is present. In one or more embodiments, the method further includes controlling a braking system if the anomaly is present.

In one or more embodiments, the method further includes controlling a velocity of the first vehicle if the anomaly is present. In one or more embodiments, the processor is configured to control a velocity of the first vehicle if the anomaly is present. For example, the velocity of the first vehicle 110 can be decreased to increase a distance between the first vehicle 110 and the front car 120 if an anomaly has been detected. In another example, the velocity of the first vehicle 110 can be increased to allow the first vehicle 110 to pass the front car 120.

In one or more embodiments, the method further includes signaling hazard lights of the first vehicle if the anomaly is present. For example, if an anomaly is detected by the vision system, and the processor determines that one or more of the rear tires have an anomaly, the processor activates the hazard lights of the first vehicle 110 to notify other surrounding vehicles that an event is imminent and to take greater caution.

In one or more embodiments, the method further includes observing a shape of the left rear tire and the right rear tire and determining if the car is overloaded with weight. In one or more embodiments, determining whether a car is overloaded with weight includes using the processor and vision system to monitor the tires and determine if the front car has been overloaded with weight, putting stress on the tires. The processor compares tire shapes against images from a database to determine if the tires have an anomaly or are in danger of immediate damage.

The front car rear tire anomalies detection system will add value to ADAS products because it will reinforce safety for car passengers and will reduce car accidents. The predictive capabilities of the anomalies detection system will keep the driver informed and allow for the driver to be better prepared if tire failure occurs.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A method comprising:
   observing one or more rear tires of a front car with a vision system of a first vehicle;
   determining whether the one or more of the rear tires have an anomaly; and
   sending an alert to at least one of a braking system of the first vehicle and a speed control system of the first vehicle in response to the one or more rear tires of the front car having the anomaly.

2. The method as recited in claim 1, further comprising:
   observing a chassis of the front car with the vision system of the first vehicle; and
   determining whether the chassis of the front car has an inclination.

3. The method as recited in claim 2, wherein sending the alert to at least one of the braking system of the first vehicle and the speed control system of the first vehicle is in response to one or more rear tires of the front car having the anomaly and the chassis of the front car having the inclination.

4. The method as recited in claim 1, wherein observing one or more rear tires for a front car is further defined as observing a left rear tire and a right rear tire of a front car with a vision system of a first vehicle and determining whether the one or more of the rear tires have the anomaly includes comparing difference in shape from the left rear tire and the right rear tire.

5. The method as recited in claim 1, wherein determining whether the one or more of the rear tires have the anomaly includes determining whether one or more of the rear tires have low pressure.

6. The method as recited in claim 1, wherein determining whether the one or more of the rear tires have the anomaly includes determining whether one or more of the rear tires ruptured.

7. The method as recited in claim 1, further comprising controlling the braking system in response to receiving the alert regarding the anomaly being present.

8. The method as recited in claim 1, further comprising preparing the braking system for sudden braking in response to receiving the alert regarding the anomaly being present.

9. The method as recited in claim 1, further comprising controlling a velocity of the first vehicle if the anomaly is present.

10. The method as recited in claim 1, further comprising signaling hazard lights of the first vehicle if the anomaly is present.

11. The method as recited in claim 1, further comprising observing a shape of the left rear tire and the right rear tire and determining if the car is overloaded with weight.

12. A front car rear tire anomalies detection system comprising:
   a vision system configured to be mounted on a first vehicle, the vision system configured to observe one or more rear tires of a front car;
   a processor communicatively coupled with the vision system, the processor configured to determine whether the one or more of the rear tires have an anomaly; and
   a communications module communicatively coupled with the processor, the communications module configured to send an alert to at least one of a braking system of the first vehicle and a speed control system of the first vehicle in response to the one or more rear tires of the front car having the anomaly.

13. The front car rear tire anomalies detection system as recited in claim 12, wherein the vision system is configured to observe a chassis of the front car and the processor is configured to determine whether the chassis of the front car has an inclination.

14. The front car rear tire anomalies detection system as recited in claim 13, wherein the communications module is configured to send the alert to at least one of a braking system of the first vehicle and a speed control system of the first vehicle in response to one or more rear tires of the front car having the anomaly and the chassis of the front car having the inclination.

15. The front car rear tire anomalies detection system as recited in claim 12, wherein the vision system is configured to observe a left rear tire and a right rear tire of the front car and the processor is configured to compare a difference in shape from the left rear tire and the right rear tire and wherein a difference in shape is utilized to determine whether one or more of the rear tires of the front car has an anomaly.

16. The front car rear tire anomalies detection system as recited in claim 12, wherein the processor is configured to prepare the braking system for sudden braking if the anomaly is present.

17. The front car rear tire anomalies detection system as recited in claim 12, wherein the processor is configured to control a velocity of the first vehicle if the anomaly is present.

18. The front car rear tire anomalies detection system as recited in claim 12, wherein the processor is configured to signal hazard lights of the first vehicle if the anomaly is present.

* * * * *